No. 768,510. PATENTED AUG. 23, 1904.
E. J. BROOKS.
SNAP SEAL.
APPLICATION FILED JUNE 8, 1904.
NO MODEL.
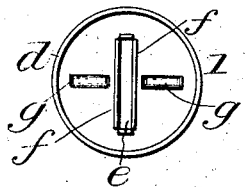
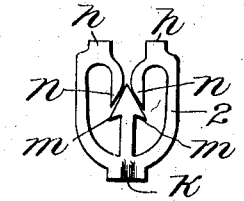
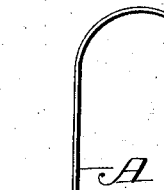
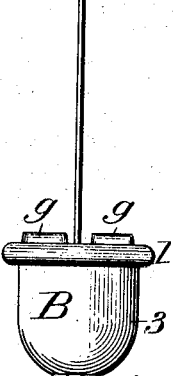
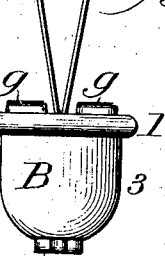
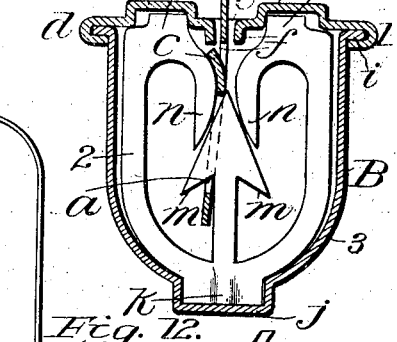
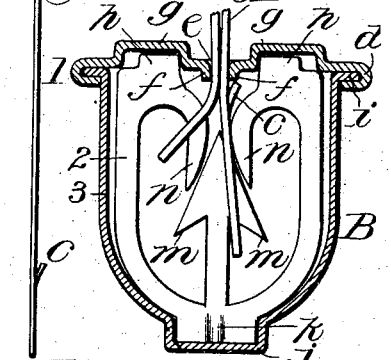
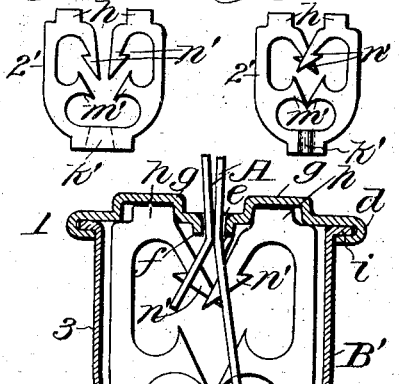
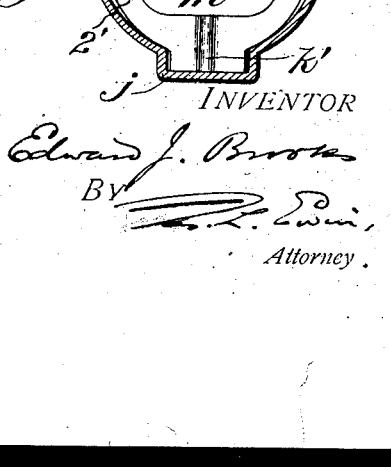
WITNESSES:
C. H. Walker.
E. Thos. Loftus.
INVENTOR
Edward J. Brooks
BY
Attorney.

No. 768,510. Patented August 23, 1904.

UNITED STATES PATENT OFFICE.

EDWARD J. BROOKS, OF EAST ORANGE, NEW JERSEY.

SNAP-SEAL.

SPECIFICATION forming part of Letters Patent No. 768,510, dated August 23, 1904.

Application filed June 8, 1904. Serial No. 211,716. (No model.)

*To all whom it may concern:*

Be it known that I, EDWARD J. BROOKS, a citizen of the United States of America, and a resident of East Orange, in the State of New Jersey, have invented a new and useful Improvement in Snap-Seals, of which the following is a specification.

This invention relates to self-fastening seals, or "snap-seals," as they are herein termed, for use as substitutes for lead-and-wire seals and other sealing devices to secure the doors of railway freight-cars and for other sealing purposes. Previous forms of such snap-seals are set forth in my specifications forming part of United States Letters Patent No. 679,104, dated July 23, 1901; Nos. 696,002 and 696,003, dated March 25, 1902; No. 697,375, dated April 8, 1902; No. 712,250, dated October 28, 1902; Nos. 719,642 and 719,643, dated February 3, 1903; No. 736,682, dated August 18, 1903, and previous specifications therein referred to. The present invention is more particularly an improvement on the sheet-metal snap-seal set forth in said specification forming part of Letters Patent No. 696,002, characterized by the employment within the seal part of a sheet-metal "middle piece" provided with a plurality of catches adapted to interlock with both shackle ends successively or simultaneously and to afford multiplied guards against the release and withdrawal of either shackle end after the seal is fastened without so defacing the seal as to insure detection.

The distinguishing object of the present invention is to greatly simplify the internal construction of the seal part, and particularly of the middle piece, this part of the improved seal being adapted to be stamped from thin sheet-steel or a suitable grade of tin-plate, hereinafter termed "tin," at a single operation and to demand very little resiliency in the snap-catches or in the shackle ends to insure successful coöperation.

The present invention consists in certain novel combinations of parts hereinafter set forth and claimed.

A sheet of drawings accompanies this specification as part thereof.

Figures 1 and 2 are face and edge views of the sheet-metal shackle flat. Figs. 3 and 4 are edge and bottom views of the cap of the seal part as it leaves the dies by which it is produced in quantity as one piece of the seal part. Figs 5 and 6 are side and edge views of a new middle piece as it leaves its dies. Figs. 7 and 8 are side and top views of the body piece or cup of the seal part as it leaves its dies. Fig. 9 is an elevation of an improved seal as it leaves the factory with the parts permanently united at one end of the shackle. Fig. 10 is a like view of the same seal applied to a pair of car-door staples and fastened. Figs. 11 and 12 are magnified sectional views illustrating the operation of the new middle piece. Figs. 13 and 14 are side views of another middle piece, illustrating a modification or second species; and Fig. 15 represents a section through the seal part of an improved seal provided with a middle piece of said second species.

Like reference letters and numbers refer to like parts in all the figures.

In either of its forms the improved seal is composed of a flexible shackle A of any suitable sheet metal, preferably tin, and a seal part B or B', composed of three pieces marked, respectively, 1, 2, and 3 or 1, 2', and 3, all of which may be of the same material. The shackle A for either form of the seal is or may be constructed with a rectangular catch-hole $a$ and a round catch-hole $b$ in its respective ends or with catch-holes of either of these forms, and it is preferably, but not necessarily, provided with a supplemental V-shaped catch $c$, projecting on what may be termed the "face" of the shackle and projecting toward mid-length, which face of the shackle is commonly in practice provided with suitable distinguishing marks. (Represented in Fig. 1 by the characters XYX RR 7985.) In both species the respective shell-pieces 1 and 3 of the seal part B or B' are conveniently and preferably of one and the same pattern. The top or cap piece 1, in addition to the customary seaming-flange $d$, Figs. 3 and 4, and the customary central inlet-hole $e$, Fig. 4, with its inturned catch-flanges $f$ to interlock with said supplemental catches $c$ on the shackle ends, is constructed with a pair of embossed sockets $g$ to interlock with projections $h$ on the upper end of the middle piece 2 or 2' when the pieces are united, and the bottom or body piece 3, in addition to its seaming-flange $i$, Figs. 7 and 8, to interlock with said seaming-flange $d$, is constructed with a cruciform embossed socket $j$ to interlock with a foot $k$ or $k'$, formed on the lower end of the middle piece 2 or 2' when the pieces are united. The middle piece is thus held securely in place within the seal part in a central plane at right angles to that of the inlet-hole $e$ and is at the same time left loose, so that its upper end may expand and contract edgewise when the shackle ends are inserted. In each species the middle piece 2 or 2' is further constructed with two pairs of catches $m$ and $n$ or $m'$ and $n'$, arranged to interlock with the respective ends of the shackle A normally and as emergency-catches, the latter, $n$ or $n'$, serving also as guides to direct the shackle ends into locking engagement with the main catches $m$ or $m'$ and all said catches being integral with the body of the middle piece and adapted to be formed complete in the act of cutting the middle piece out of sheet metal by a punching operation. The foot $k$ or $k'$ of each middle piece is crimped at the same operation, so as to provide it with a lateral projection, as shown, adapting it to occupy any three of the four arms of the cruciform socket $j$ in the bottom of the body-piece and to stiffen the lower end of the middle piece.

In the species represented by Figs. 1 to 12, inclusive, the middle piece 2, Figs. 5 and 6, maintains its flat shape apart from the lateral projection of the foot $k$, its catches $m$ and $n$ being in one and the same plane and respectively formed by an arrow-shaped upright central portion of the middle piece and by a pair of inward projections $n$.

In the species represented by Figs. 13, 14, and 15, in connection with Figs. 1 and 2, Figs. 3 and 4, and Figs. 7 and 8, the catches $m'$ and $n'$ of the middle piece 2' are all in the form of inwardly-projecting barbed prongs, and in the act of crimping the foot $k'$, as shown by a comparison of Figs. 13 and 14, the catches of each pair are drawn inward, so that the emergency-catches $n'$ overlap each other in the finished middle piece, Figs. 14 and 15, and the main catches $m'$ are in touch with each other or close enough to prevent the escape of either shackle end between their adjoining points.

After uniting the pieces of the seal part B or B', as above indicated, one end of the shackle A is inserted through the inlet-hole $e$ and fastened in place at the factory to test the catches and to permanently unite the parts of each seal, so that they may be handled as one part. The improved seal as thus completed at the factory is represented by Figs. 9 and 11. In use the free end of the shackle A is passed through a pair of car-door staples C, Fig. 10, or the like and then inserted through the inlet $e$ into the seal part until it strikes the bottom and interlocks with one of the main catches $m$ or $m'$, as shown at the right in Fig. 12 or Fig. 15. Should either shackle end be disengaged from such main catch $m$ or $m'$ by manipulation with the aid of tools such as are used in tampering with snap-seals and should its supplemental catch $c$ fail, the appropriate emergency-catch $n$ or $n'$ affords a third safeguard against unfastening the seal, as illustrated at the left in Figs. 12 and 15.

The shapes of the respective pieces of the seal parts, including the middle piece of each, may be changed considerably without departing from the essential features of construction hereinafter pointed out in the claims, and other like modifications will suggest themselves to those skilled in the art.

Having thus described said improvement, I claim as my invention and desire to patent under this specification—

1. The combination, in a snap-seal, of a flexible shackle having catch-holes in its respective ends, and a seal part comprising a cap-piece and a cup-shaped body-piece united with each other by a circumferential seam and provided with an inlet-hole in said cap-piece and with sockets in the under side of said cap-piece and in the upper side of the bottom of said body-piece, and a middle piece within the seal part having projections within said sockets and thereby held in place in a plane at right angles to that of said inlet-hole, said middle piece being further constructed with catches to interlock with said catch-holes in the shackle ends.

2. The combination, in a snap-seal, of a flexible shackle having catch-holes in its respective ends and provided with supplemental catches projecting from the face of the shackle above said catch-holes in the fastened seal, and a seal part comprising a cap-piece and a cup-shaped body-piece united with each other by a circumferential seam and provided with an inlet-hole and subjacent catch-flanges in said cap-piece and with sockets in the under side of said cap-piece and in the upper side of the bottom of said body-piece, and a sheet-metal middle piece within the seal part having projections within said sockets and thereby held in place in a plane at right angles to that of said inlet-hole, said middle piece being further constructed with catches to interlock with said catch-holes in the shackle ends.

3. In a snap-seal, the combination with a flexible shackle having catch-holes in its ends of a seal part comprising a cap-piece and a cup-shaped body-piece united with each other by a circumferential seam and provided with an inlet-hole in said cap-piece and with sockets in the under side of said cap-piece and in the upper side of the bottom of said body-piece, and a sheet-metal middle piece within the seal part having projections within said sockets and thereby held in place in a plane at right angles to that of said inlet-hole and so as to be expansible edgewise, said middle piece being further constructed with catches projecting laterally inward to interlock with said catch-holes in the shackle ends, and adapted to be expanded edgewise by the shackle ends.

4. In a snap-seal, the combination with a flexible shackle having catch-holes in its ends of a seal part comprising a cap-piece and a cup-shaped body-piece united with each other by a circumferential seam and provided with an inlet-hole in said cap-piece and with sockets in the under side of said cap-piece and in the upper side of the bottom of said body-piece, and a sheet-metal middle piece within the seal part having projections within said sockets and thereby held in place in a plane at right angles to that of said inlet-hole, said middle piece being further constructed with two pairs of catches one above the other adapted to interlock successively with said catch-holes in the shackle ends.

5. In a snap-seal, the combination with a flexible shackle having catch-holes in its ends of a seal part comprising a cap-piece and a cup-shaped body-piece united with each other by a circumferential seam and provided with an inlet-hole in said cap-piece and with sockets in the under side of said cap-piece and in the upper side of the bottom of said body-piece, and a sheet-metal middle piece within the seal part having projections within said sockets and thereby held in place in a plane at right angles to that of said inlet-hole and so as to be expansible edgewise, said middle piece being further constructed with two pairs of catches one above the other adapted to interlock successively with said catch-holes, and the upper end of said middle piece carrying said upper or emergency catches being expansible edgewise by the shackle ends.

6. In a snap-seal, the combination with a flexible shackle having catch-holes in its ends of a seal part comprising a cap-piece and a cup-shaped body-piece united with each other by a circumferential seam and provided with an inlet-hole in said cap-piece, and a sheet-metal middle piece supported within the seal part in a plane at right angles to that of said inlet-hole and constructed with a pair of main catches formed by an arrow-shaped middle portion and with a pair of emergency-catches projecting laterally inward above said main catches said catches being adapted to interlock successively with said catch-holes, and the said emergency-catches serving also as guides to insure interlocking the shackle ends with said main catches.

7. In a snap-seal, the combination with a flexible shackle having catch-holes in its ends of a seal part comprising a cap-piece and a cup-shaped body-piece united with each other by a circumferential seam and provided with an inlet-hole in said cap-piece and with sockets in the under side of said cap-piece and a cruciform socket in the upper side of the bottom of said body-piece, and a sheet-metal middle piece within the seal part having projections within said sockets in the cap-piece and a foot-forming projection within said socket in the body-piece, and thereby held in place in a plane at right angles to that of said inlet-hole, said middle piece being further constructed with catches to interlock with said catch-holes in the shackle ends, substantially as hereinbefore specified.

EDWARD J. BROOKS.

Witnesses:
THOMAS TIERNEY,
C. H. IVES.